G. F. MYERS.
AIRCRAFT.
APPLICATION FILED DEC. 6, 1916.
1,427,314.
Patented Aug. 29, 1922.
2 SHEETS—SHEET 1.
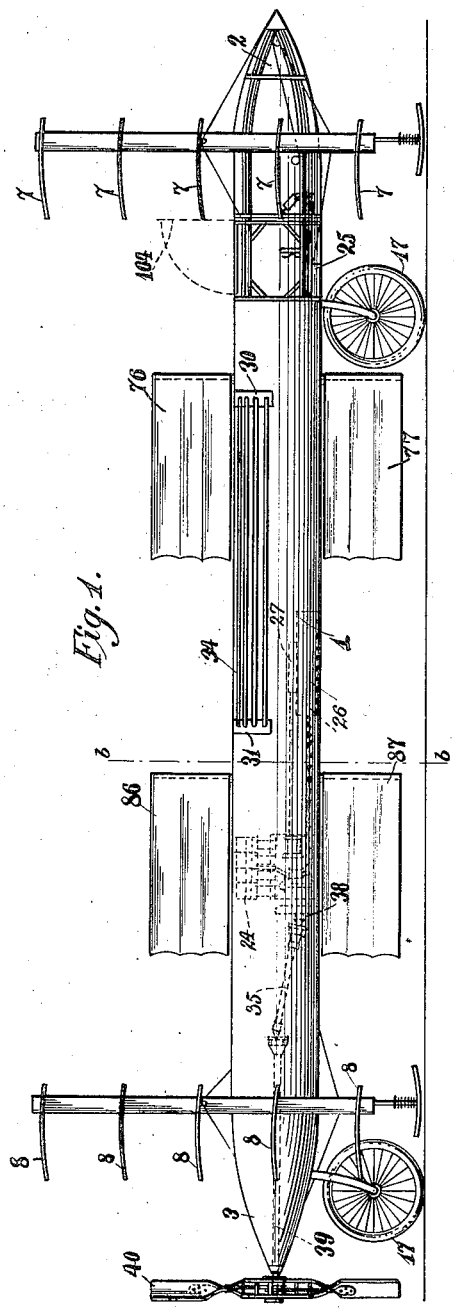
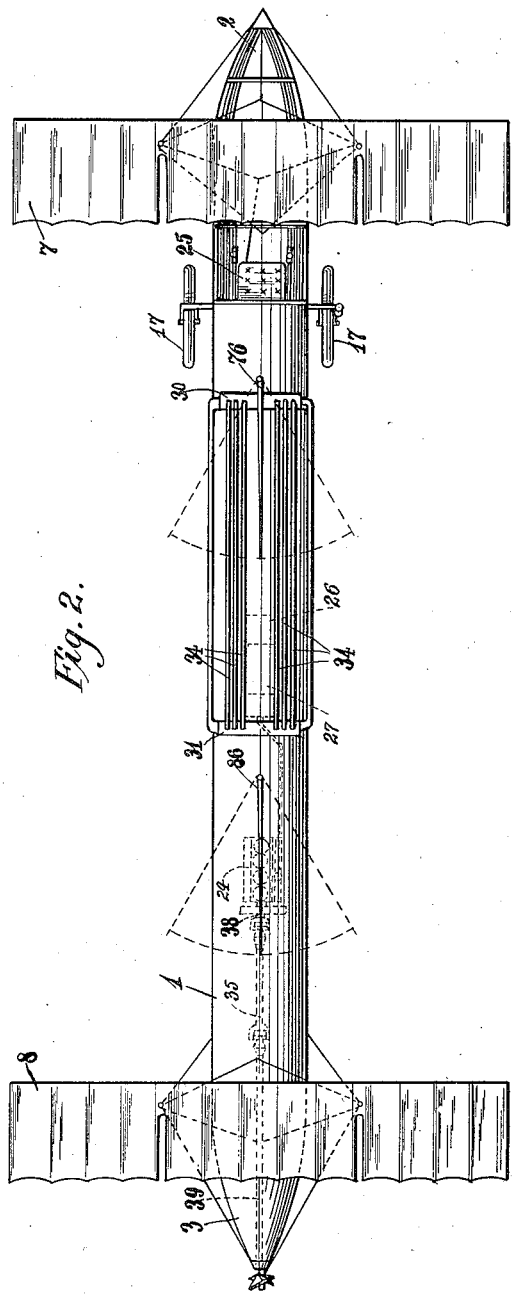
Inventor:
George Frank Myers

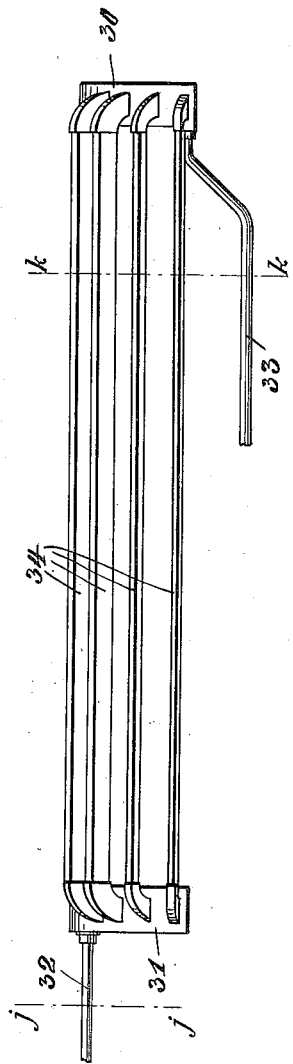
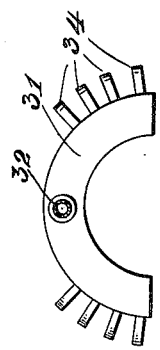
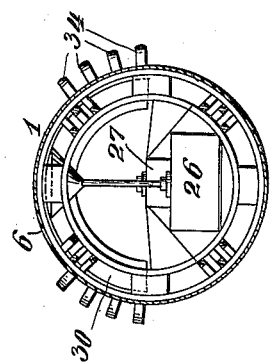
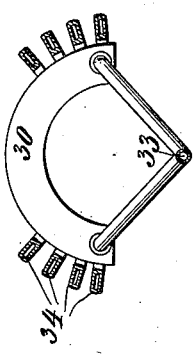

UNITED STATES PATENT OFFICE.

GEORGE FRANCIS MYERS, OF NEW YORK, N. Y., ASSIGNOR TO MYERS AIRCRAFT CORPORATION, A CORPORATION OF DELAWARE.

AIRCRAFT.

1,427,314. Specification of Letters Patent. Patented Aug. 29, 1922.

Original application filed July 9, 1909, Serial No. 506,817. Divided and this application filed December 6, 1916. Serial No. 135,339.

*To all whom it may concern:*

Be it known that I, GEORGE FRANCIS MYERS, a citizen of the United States, and residing at New York city, in the county of New York and State of New York, have invented a new and useful Aircraft, of which the following is a specification.

This invention relates to aircraft.

The object of the invention is a combined aircraft body and radiator so constructed and arranged with reference to each other that they form a substantially rigid structure and their combined resistance to travel through the air is minimized without impairing the efficiency of the radiator as a cooling agent. The invention is illustrated in connection with aircraft of the heavier than air type although certain features thereof are also applicable to aircraft of the lighter than air type.

With these and other objects in view, as will more fully hereinafter appear, the invention consists in certain novel features of construction and arrangement of parts hereinafter described, illustrated in the accompanying drawings, and specifically pointed out in the claims appended hereto, it being understood that various changes in the form, proportions, size and minor details of the structure may be made without departing from the spirit of the invention.

This application is a division of my companion application filed July 9, 1909 and serially numbered 506,817.

In the accompanying drawings:

Figure 1 is a side elevation of the machine resting on the ground showing the radiator or condenser in situ.

Figure 2 is a top plan view thereof.

Figure 3 is a detached side elevation of the radiator or condenser.

Figures 4 and 5 are cross sections of the same on the line *j—j* and *k—k* of Figure 3, respectively.

Figure 6 is also a cross section of the same on the line *b—b* of Figure 1.

Similar numerals of reference refer to like parts in the several views.

The vehicle is constructed substantially and preferably as follows: and consists of or includes or comprises—that is to say besides other things the vehicle has—a hollow body which has the form of a longitudinal cylinder provided with conical front and rear ends 2, 3; at the front and rear ends of the said body 1 are the sets or series of superposed horizontal transverse planes 7 and 8; rudders 76 and 77, and 86 and 87; wheels 17; and propeller 40; all more particularly described in the said companion application.

The motor or engine 24 is shown placed near the rear set of planes and the seat 25 for the operator near the front set of planes.

The radiator or temperature-changing device for use in cooling the water of an internal combustion or gasolene engine or for condensing the exhaust steam when the motor is a steam engine, comprises two manifolds 30, 31, of crescent form arranged one in front of the other in the upper part of the body within the covering, the upper part of one of said manifolds being connected with the outlet pipe 32 of the engine cooling system in the case of a gasolene engine and the lower part of the other manifold being connected by a pipe 33 with the inlet of the engine, and a plurality of radiating pipes 34 arranged lengthwise on the outer side of said covering and parallel with the axis of the body, and each having its ends curved inwardly and connected with the front and rear manifolds and flattened, so that the sides thereof are arranged radially relatively to the axis of the body, as shown. As will be seen, these manifolds or tanks of the radiator are inside the covering of the body, and therefore offer no head resistance to the machine. The radiator elements 34 are observed to closely embrace the closed exterior of the body and are therefore substantially within the stream line thereof, the body being of an approximately stream lined formation. This arrangement results in a good structural combination and moreover the combined resistance of the body and radiator is a minimum with good cooling efficiency.

From the motor an inclined shaft 35 extends rearwardly, the same being coupled by universal joints to the engine or motor shaft 38 and to the longitudinal shaft 39 which projects rearwardly from the rear end of the body and to which is fastened the said propeller 40. The said engine or motor received its fuel and oil from the tanks 26 and 27.

Above the operator's compartment the top of the body is provided with an opening through which the operator enters this compartment. This last-mentioned opening is normally closed by a door 104 which is transparent and pivoted at its front end to the body to swing vertically. By this means the operator when starting the machine can raise this door and hold the same in this position by means of his head. When thus raised, the operator can look forwardly through the door as well as sidewise and rearward during which time he is protected from the pressure of the air and flying insects, and when he again lowers his head, the door will be automatically closed by gravity and air pressure, thereby avoiding any special attention on the part of the operator or any special mechanism for this purpose.

One of the important problems to be solved, in aerial navigation, is that of the stability of the aerodyne, both as regards its longitudinal axis, and transversely; i. e. to keep it from pitching and rolling.

86, 87 represent the upper and lower upright sections of a stabilizer which are arranged vertically above and below the body and in the rear of the rudder. These stabilizer sections are normally arranged in the same plane as the rudder and are operatively connected so that they may be turned simultaneously in opposite directions.

When the flying machine careens toward one side, both stabilizer sections should be deflected by the operator in the proper direction so that the pressure of the air against the same rights the machine.

As my invention is, in many of its aspects, generic I do not limit myself to the particular construction shown or described, but also contemplate the employment of such equivalents as fairly fall within the scope of the claims.

In this connection I may add that the word "aeroplane" includes not only flying machines with rigid or fixed aerosurfaces, but also includes machines having revolving aerosurfaces known as helicopters, as well as machines with flapping aerosurfaces and sometimes called ornithopters.

It will therefore be understood that I may make various changes in the form, proportion, size and detail of the several structures shown, the number and position of certain elements used, as well as the character of the motive power employed, without departing from the spirit of the invention.

I claim:

1. In an aeroplane, the combination of aero sustaining surfaces, a main body or car carried thereby, said car being of elongated, cylindrical form and extending in the direction of travel and having a tapered rear end, a motor and air propeller for driving the machine at sustaining speed through the air, and a radiator for said motor mounted on the car and closely embracing a closed portion of the exterior thereof, said radiator and car thereby presenting a substantially continuous uninterrupted surface in the fore and aft direction for the purpose set forth.

2. In an aeroplane, the combination of aero sustaining surfaces, a main body or car carried thereby, said car being of elongated, tubular form, and extending in the direction of travel and having a tapered rear end, a motor and an air propeller for driving the machine at sustaining speed through the air, and a radiator for said motor mounted on the car, and having elements which extend in the direction of travel and closely embrace a closed portion of the car, whereby the machine encounters a minimum of resistance to flight and enables the motor to drive it at a greater speed, and the efficiency of the radiator is maintained unimpaired.

3. In an aeroplane, the combination of aero sustaining surfaces, a main body or car carried thereby, said car being of elongated, tubular form and extending in the direction of travel and having a tapered rear end, a motor and air propeller for driving the machine at sustaining speed through the air, and a plurality of radiating elements for said motor mounted on the car, said radiator elements extending in the direction of travel and closely disposed outside a closed portion of the surface of the car, whereby the combined resistance of the radiator and fuselage is minimized without impairing the efficiency of the radiator as a cooling agent.

4. An aircraft comprising a main body or closed car, said car being of elongated form and extending in the direction of travel and having an exterior formation such that the air currents in sweeping therepast experience no abrupt changes in curvature in the fore and aft direction, a motor and propeller on said body and a radiator which is juxtaposed to said car and disposed outside and closely embracing a closed portion thereof and is otherwise so arranged with reference to the curvature of the body that the car and radiator together form a substantially single resistant body and the resistance to passage through the air is a minimum for a predetermined heat dissipation from the radiator.

5. In an aeroplane, the combination of aero sustaining surfaces, a main body or car carried thereby, said car being of elongated form extending in the direction of travel and being of substantially stream line form, a motor and air propeller for driving the machine at sustaining speed through the air, and a radiator for said motor mounted on the car and closely embracing a closed portion of the exterior thereof, said radiator and car thereby presenting a substantially continuous uninterrupted surface in the fore and aft direction for the purpose set forth.

6. In an aeroplane, the combination of aero sustaining surfaces, a main body or car carried thereby, said car being of elongated form and extending in the direction of travel and whose formation is such that the air currents in sweeping therepast experience no abrupt changes in curvature in the fore and aft direction, a motor and an air propeller for driving the machine at sustaining speed through the air, and a radiator for said motor conforming to the curvature of the car and juxtaposed with reference thereto in such manner that the resistance of the two constructed and combined in this manner is less than the sum of the separate resistances of the radiator and the car.

7. In an aeroplane, the combination of aero sustaining surfaces, a main body or car carried thereby, said car being of elongated form and extending in the direction of travel and having a tapered rear end, a motor and an air propeller for driving the machine at sustaining speed through the air, and a plurality of radiator elements for said motor, mounted on the car, said elements extending parallel to and in close proximity to the surface of the car, and manifolds for said elements disposed within the car whereby the resistance to travel through the air is a minimum, and the radiating efficiency of the element is a maximum.

8. An aircraft comprising a main body or closed car, said car being of elongated form and extending in the direction of travel and having exterior formation such that the air currents in sweeping therepast experience no abrupt changes in curvature in the fore and aft direction, and a radiator in sections juxtaposed to and symmetrically arranged on opposite sides of the car, the radiator sections closely embracing the surface of the car and so arranged with reference to the longitudinal curvature thereof that the car and radiator together form substantially a single resistant body and the resistance to passage through the air is less than the sum of the separate resistances of the radiator and the car.

9. An aircraft comprising a main body or closed car, said car being of elongated form and extending in the direction of travel and having an exterior formation such that the air currents in sweeping therepast experience no abrupt changes in curvature in the fore and aft direction, and a radiator having its radiating elements proper juxtaposed to and in close proximity to the outer surface of the car and having its manifolds disposed and entirely enclosed within the car whereby the car and radiator together form substantially a single resistant body and the resistance to passage through the air is less than the sum of the separate resistance of the devices.

GEORGE FRANCIS MYERS.